Feb. 10, 1948.     C. W. MERRIAM, JR     2,435,596
OILING DEVICE
Filed May 22, 1945

INVENTOR
CHARLES W. MERRIAM JR.

BY Ralph L Chappell
ATTORNEY

Patented Feb. 10, 1948

2,435,596

UNITED STATES PATENT OFFICE 2,435,596

OILING DEVICE

Charles W. Merriam, Jr., United States Navy, Taunton, Mass.

Application May 22, 1945, Serial No. 595,228

6 Claims. (Cl. 308—187)

(Granted under the act of March 3, 1883, as amended April 30, 1928; 370 O. G. 757)

My invention relates to an oiling device. It has to do, more particularly, with an oiling device that is especially suitable for use with the bearings that support the rotor case of a gyroscope, although it is not limited thereto.

In gyroscopes, the horizontal bearings for the rotor case in which the spinning wheel is enclosed, are so located, on the non-pendulous type of gyroscope, that they are difficult to reach with an oilcan or similar oiling device. The oil-admittance opening usually provided in such bearings is of such a nature that the spout of the oilcan must be disposed substantially axially of the bearing to supply oil properly thereto. It is practically impossible to so position an oilcan spout, while the gyroscope is in operation, due to the nearness of the adjacent phantom ring of the gyroscope which closely surrounds the vertical ring that carries the rotor case. Furthermore, in positioning the spout of the oilcan as near as possible to an axial position relative to the bearing, the spinning wheel is disturbed by torque applied around the vertical axis of the supporting ring thereof, thereby causing the gyroscope to precess and disturbing the orientation of the gyroscope. Because of these difficulties, the horizontal rotor case bearings of a gyroscope are frequently neglected and do not receive proper lubrication.

The object of my invention is to provide an oiling device which is particularly suitable for use with a gyroscope to oil the horizontal bearings that support the rotor case thereof, such device being extremely simple but very effective to supply the oil to the bearings even while the gyroscope is operating.

The preferred embodiment of my invention is illustrated in the accompanying drawing wherein similar characters of reference designate corresponding parts and wherein.

Figure 1:
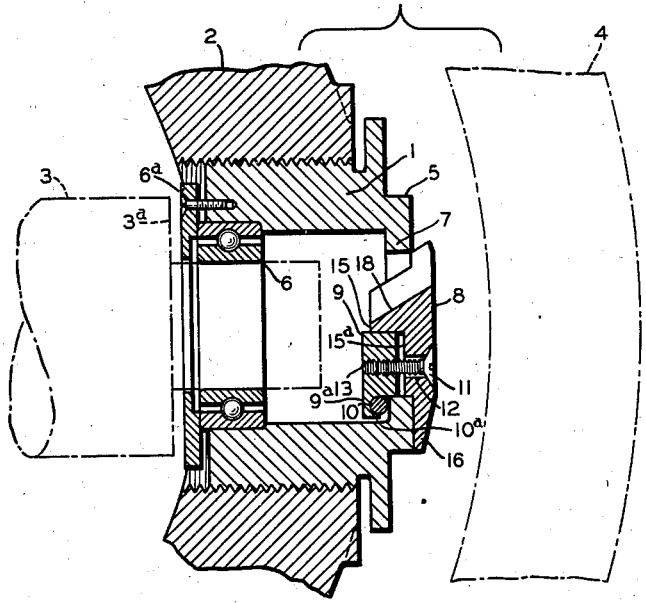
Fig. 1 is a sectional view of a bearing in its cartridge showing my oiling device associated therewith.
Figure 2:
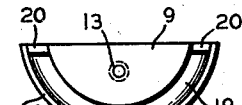
Fig. 2 is an elevational view of the seal-carrying member of my device.

With reference to the drawing, I have shown my oiling device in Fig. 1 associated with the bearing cartridge 1 which is carried by a vertical ring 2 of a gyroscope. This ring 2 supports the rotor case by means of the horizontal case pivot 3, indicated by dotted lines, which extends into cartridge 1. Closely surrounding the ring 2 is a second or phantom ring 4, indicated by dotted lines, the distance between these two rings being essentially constant.

Figure 4:
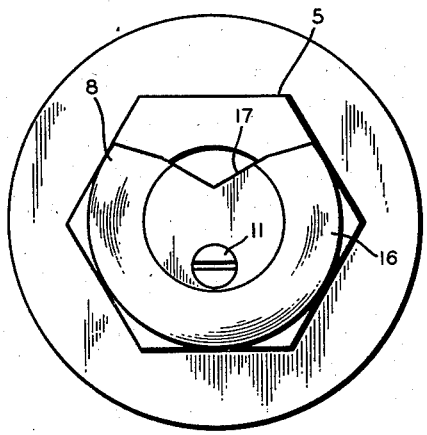
Fig. 4 is a plan view of my device.

The bearing cartridge 1 is in the form of a sleeve which is threaded into an opening in the vertical ring 2. The cartridge is adjusted in and out of the opening horizontally, merely by rotating it, so that it will be moved axially relative to pivot 3 to properly position the rotor case in the vertical ring. The cartridge 1 may be rotated readily through the medium of a hexagonal boss 5 (Fig. 4) formed on the outer end thereof. The inner end of the cartridge carries the ball bearing 6 which is maintained in position by an annular retainer 6a fastened to the inner end of the cartridge 1. Adjustment of cartridge 1 in and out of ring 2 will determine the clearance between retainer 6a and the enlargement 3a of pivot 3. The boss 5 on the outer end of cartridge 1 is provided with an inwardly projecting annular flange 7.

My oiling device comprises mainly an outer disk 8, an inner segmental seal-carrying plate 9, and a semi-circular seal 10. The disk 8 is joined to the plate 9 by a screw 11 which passes through an opening 12 in disk 8 and is threaded into an opening 13 in plate 9.

Figure 3:
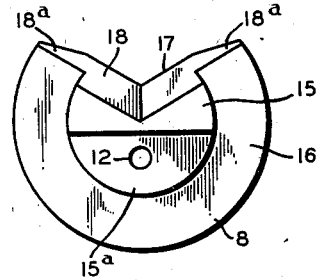
Fig. 3 is an inside elevational view of the oil-receiving and directing member of my device.

The disk 8 has on its inner surface a boss 15 in which a segmental recess 15a is formed. The recess 15a is of the same outline as plate 9 and receives such plate. The disk 8 is also provided with a peripheral flange 16 which is adapted to overlap the flange 7 of boss 5. The edge of disk 8 is provided with a V-shaped notch 17. This notch 17 is beveled inwardly towards the center of disk 8 to provide an inclined oil-directing surface or trough 18. It will be noted from Fig. 3 that this trough 18 has portions 18a extending along the flange 16 to the extreme outer edge of the flange.

The plate 9 has formed in a lip 9a, projecting therefrom at its inner surface, a seal-retaining groove 19 of semi-circular form. This groove 19 will receive the sealing member 10 which is of arcuate form and is preferably made of soft metal wire. The groove 19 is shallow, and its ends may be filled with solder, as indicated at 20, to prevent movement of the wire 10 out of either end of the groove. If desired, the entire groove 19 may be filled with solder, which projects outwardly therefrom to serve as a seal instead of using a wire 10.

In mounting my oiling device on the boss 5 of cartridge 1, the plate 9 is positioned within the flange 7 of boss 5. The wire 10 will be in position in groove 19. The disk 8 is then positioned on flange 7 with the boss 15 extending into the opening formed therewithin. The disk 8 is so positioned relative to plate 9 that the plate will be positioned in recess 15a. The screw 11 is then inserted and tightened to cause plate 9 to be positioned within flange 7 and lip 9a to overlap the flange, and members 8 and 9 to be clamped to the flange 7. This causes the sealing wire 10 to firmly engage the inner surface of the flange 7.

The disk 8 and associated parts of my device are so positioned that the V-shape notch 17 will be uppermost. It will be apparent that the position of disk 8 can be adjusted regardless of the position to which the cartridge 1 is rotated in properly adjusting it. It is merely necessary to loosen screw 11, rotate my oiling device in the boss 5 to properly position it, and then tighten the screw to secure it in position.

It will be apparent that the bearing may be effectively oiled with my device. It is merely necessary to touch the tip of the spout of the oil-can at any point on the flat outer surface of the boss 5 above notch 17 of disk 8 and the oil will travel on to surfaces 18a or 18 of the oil-directing trough. It is not necessary that the spout be positioned axially of the bearing and the ring 4 will, therefore, not interfere with the oiling of the bearing. Furthermore, there will be no danger of creating torque around the vertical axis which would cause the gyroscope to precess. The oil will be directed inwardly and downwardly by the surfaces 18a and 18. The wire 10 will serve as an effective seal to substantially prevent leakage of oil from the lower part of my device.

The invention described herein may be manufactured and used by or for the Government of the United States of America for government purposes without the payment of any royalty thereon or therefor.

Having thus described my invention, what I claim is:

1. In combination an oiling device and a bearing having a flange on the outer end thereof, said oiling device including a disk having a lubricant receiving and directing surface formed thereon, said disk being of a size to overlap said flange, a plate disposed within said flange, and means connecting said plate to said disk for causing them to grip said flange.

2. A structure according to claim 1 wherein said disk has a V-shape notch with an inwardly directed beveled surface for receiving and directing the lubricant.

3. In combination an oiling device and a sleeve having an inwardly directed flange on the outer end thereof, said oiling device including a disk associated with and overlapping said flange, said disk having a substantially V-shape notch formed in the edge thereof, the edge of said notch being beveled inwardly to form an inwardly directed lubricant receiving and directing surface, a boss formed on the inner surface of said disk and adapted to extend within said flange, said boss having a recess formed therein, a plate adapted to be disposed within said recess and to overlap the inner surface of said flange, and a member securing said disk and said plate together in clamping relationship to said flange.

4. A structure according to claim 3 wherein said recess is opposite said notch and said plate carries a seal with contacts with the inner surface of said flange.

5. An oiling device comprising a disk adapted to be associated with a bearing, said disk having a V-shaped portion adjacent its periphery removed to provide a lubricant receiving and directing surface, and means for securing said disk to said bearing at any selected position angularly of said bearing.

6. In combination an oiling device and a bearing having a flange on the outer end thereof, said oiling device including a disk having a V-shape notch with an inwardly directed beveled surface for receiving and directing the lubricant, said disk being of a size to overlap said flange, a plate disposed within said flange, a sealing member carried by said plate which contacts with the inner surface of said flange, and means connecting said plate to said disk for causing them to grip said flange.

CHARLES W. MERRIAM, Jr.

REFERENCES CITED

The following references are of record in the file of this patent:

UNITED STATES PATENTS

| Number | Name | Date |
|---|---|---|
| 582,903 | Kohn | Dec. 31, 1924 |
| 901,346 | Jones | Oct. 20, 1908 |
| 1,225,577 | Chapin | May 8, 1917 |